United States Patent [19]

Tokugawa

[11] Patent Number: 4,966,393
[45] Date of Patent: Oct. 30, 1990

[54] BUCKLE STALK FOR SEAT BELT SYSTEM
[75] Inventor: Osamu Tokugawa, Fujisawa, Japan
[73] Assignee: Nippon Seiko Kabushiki Kaisha, Tokyo, Japan
[21] Appl. No.: 305,086
[22] Filed: Feb. 2, 1989
[30] Foreign Application Priority Data
  Feb. 8, 1988 [JP] Japan .............................. 63-14617[U]
  Nov. 25, 1988 [JP] Japan ............................ 63-153087[U]
[51] Int. Cl.⁵ ............................................ B60R 22/22
[52] U.S. Cl. ...................................... 280/801; 297/468
[58] Field of Search ................ 280/801, 802; 297/468, 297/482; 24/265 A, 265 BC, 265 R

[56] References Cited
U.S. PATENT DOCUMENTS

| 3,692,361 | 9/1972 | Ivarsson | 297/385 |
| 4,119,344 | 10/1978 | Kondo | 297/385 |
| 4,475,746 | 10/1984 | Akiyama | 280/801 X |
| 4,527,313 | 7/1985 | Sylven et al. | 24/265 BC X |
| 4,645,231 | 2/1987 | Takada | 280/801 |

FOREIGN PATENT DOCUMENTS

| 56-21412 | 5/1981 | Japan . | |
| 59-143450 | 9/1984 | Japan . | |
| 60-75155 | 5/1985 | Japan . | |
| 60-106861 | 7/1985 | Japan . | |
| 61-278452 | 12/1986 | Japan | 297/468 |
| 2166942 | 5/1986 | United Kingdom . | |

Primary Examiner—Charles A. Marmor
Assistant Examiner—Tamara L. Finlay
Attorney, Agent, or Firm—Wegner & Bretschneider

[57] ABSTRACT

In a buckle stalk for a seat belt system, a stalk member connecting an anchor member and a buckle includes a webbing integrally covered with a resin cover, and a suppport member extending longitudinally in a folded-back portion of the webbing at one end near the anchor member to make the stalk member self-supporting. The support member is embraced by the webbing and the resin cover in a unitary form therewith.

10 Claims, 4 Drawing Sheets

BUCKLE STALK FOR SEAT BELT SYSTEM

BACKGROUND OF THE INVENTION

1. Field of the Invention:

The present invention relates to a buckle stalk for releasably connecting a seat belt to a vehicle body or the like.

2. Description of the prior Art:

Buckle stalks for use in a vehicle such as an automobile are known which generally have at one end an anchor member, such as an anchor plate, adapted to be fastened to a vehicle body or the like and at the other end a buckle adapted for releasably holding a seat belt. The anchor member and the buckle are connected to one another by a stalk member.

With this arrangement, in order to realize good operativity, the stalk member, which is occasionally composed of a webbing, must be somewhat self-supporting so as to keep the buckle in a predetermined position relative to the seat. A self-supporting construction was disclosed in Japanese Utility Model Laid-Open Publication No. 143450/1984, for example, in which the webbing is covered by a separate resin cover and in which the anchor member has an integral tonguelike projection extending longitudinally of the webbing to support an anchor-attaching portion of the webbing.

In general, the webbing is used with opposite ends each being folded back and sewn to provide a loop. To fasten the webbing to the buckle, a pin is inserted through one of the folded-back portions of the webbing and is secured to the buckle.

Further, in order to hold a driver or a passenger reliably, it is necessary that there is no gap between the webbing and the pin so as to prevent any relative movement between the webbing and the buckle. One attempt was proposed by Japanese Utility Model Laid-Open publication No. 75155/1985, for example, in which the webbing is sandwiched between the pin and a part separate from the buckle and secured thereto. Another attempt was proposed by Japanese Utility Model Laid-Open Publication No. 106861/1985, for example, in which the webbing is sandwiched between the pin and a contact surface formed on the buckle cover.

However, if the anchor member is formed with an integral tongue like projection to assist in making the stalk member self-supporting, it is possible to reduce the weight and cost of the anchor member by only limited amounts, since the anchor member is usually made of metal. If the webbing is not located in a proper position relative to the anchor member, there would be a danger that the webbing can bear the load only inadequately when received an impact.

Further, if a separate part is used to eliminate a gap between the webbing and the pin, the total number of component parts of the buckle stalk increases, thus reducing the weight and cost of the buckle stalk, as well as the number of steps of assembling the buckle stalk, by only limited values or amounts. If the buckle cover is formed with a contact surface, the wear of the webbing and of the contact surface would result in inadequate reliability of the support of the webbing and also in inadequate stableness of the fastening of the pin.

SUMMARY OF THE INVENTION

It is therefore an object of the Present invention to Provide a buckle stalk, for a seat belt sYstem, with which the foregoing problems of the prior art can be eliminated.

According to a first asPect of the Present invention, a buckle stalk for a seat belt system comPrises: an anchor member adapted to be fastened to a vehicle body; a buckle adapted for releasably holding one end of a seatbelt strap; a stalk member connecting the anchor member and the buckle, the stalk member including an elongated webbing having at its opposite ends a pair of folded-back portions, and a cover covering the majority of the webbing and formed integrally with the webbing, the folded-back portions supporting the anchor member and the buckle at a base of said buckle; and a support member attached to the anchor member having an extension which extends longitudinally in one of the foldedback portions of the webbing to make the stalk member selfsupporting, the support member being embraced by the webbing and the cover in a unitary form therewith.

In a preferred form, the one folded-back portion near the anchor member may be covered by the cover and may be thereby connected to the anchor member.

Further, the stalk member may further include a stop extending in and through the other folded-back portion near the buckle and held by the webbing and the cover in a unitary form therewith.

According to a second aspect of the present invention, a bush, which prevents the webbing from any direct contact with the anchor plate, has a plurality of guards in the form of upright walls for preventing any laterla displacement of the webbing.

Preferably, the anchor plate may have bush-locating projections engageable with notches formed in the bush, thus preventing any mislocation during the molding.

With the foregoing construction, since the webbing is covered by a cover formed integrally therewith, the stalk member can be secured to be self-supporting, and the stop can be fastened to the buckle stably and easily. Further, partly because the casing of the buckle has a plurality of locking projections, and partly because the base of the buckle has cut-outs, any relative movement between the webbing of the stalk member and the stop and also any relative movement between those and the buckle can be prevented.

As described above, because the bush is provided with a means for preventing any lateral displacement of the webbing, it is possible to keep the webbing and the bush in a proper relative position during the resin molding.

Further, since the anchor plate ha bush-locating projections engageable with the notches formed in the bush, it is possible to prevent the anchor plate and the bush from being displaced relative to one another.

Many other advantages, features and additional objects of the present invention will become manifest to those versed in the art upon making reference to the detailed description and the accompanying drawings in which certain preferred structural embodiments incorporating the principles of the present invention are shown by way of illustrative example.

DETAILED DESCRIPTION OF THE PREFERRED EMBODIMENTS

Figure 1:
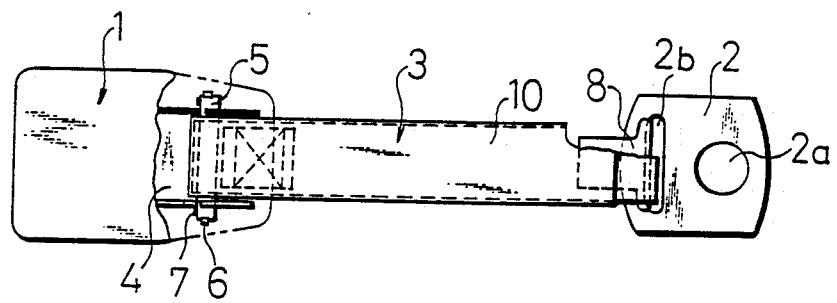
FIG. 1 is a plan view, with parts broken away, of a buckle stalk embodying the present invention.
Figure 2:
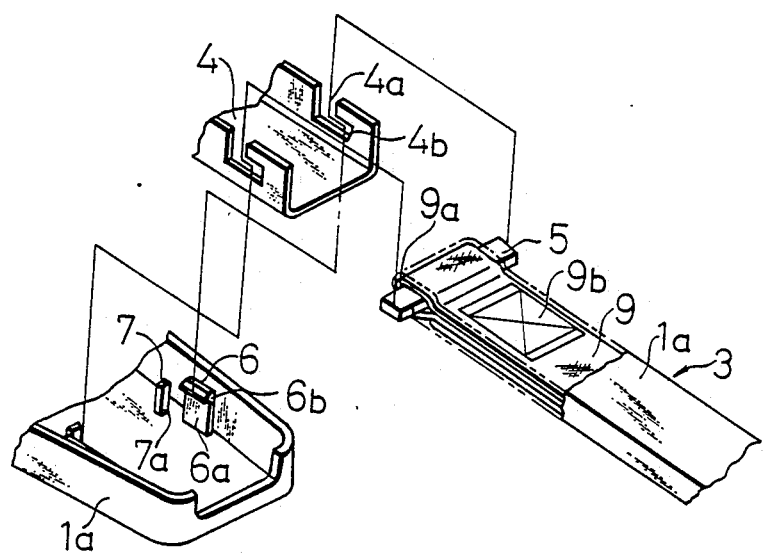
FIG. 2 is a fragmentary, exploded perspective view of the buckle stalk.
Figure 3:
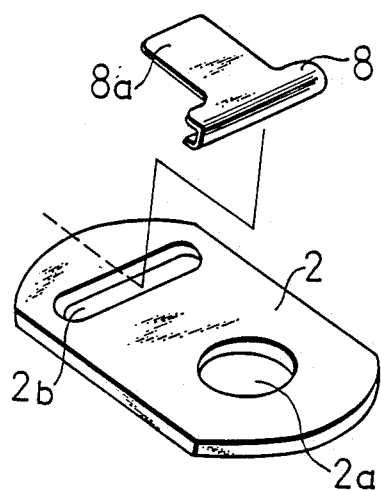
FIG. 3 is an enlarged, exploded perspective view of a bush and an anchor member of the buckle stalk.

FIGS. 1 through 3 illustrate a buckle stalk, for a seat belt system, according to a first embodiment of the present invention.

The buckle stalk generally comprises a buckle 1 adapted for releasably holding a seat belt (not shown), and an anchor member 2 in the form of an anchor plate adapted to be fastened to a vehicle body (not shown). The buckle 1 has a lower casing 1a and a non-illustrated upper casing, as shown in FIG. 2. The buckle stalk also includes a stalk member 3 connecting the buckle 1 and the anchor plate 2.

The stalk member 3 is composed of an elongated webbing 9, and a resin cover 10 formed integrally with the webbing 9. The webbing 9 has at opposite ends a pair of folded-back portions attached to the buckle 1 and the anchor plate 2, each of the folded-back portions defining a loop. In FIG. 2, which is an exploded perspective view of the first embodiment, the buckle-attaching end of the folded-back webbing portion is designated by 9a. The folded-back portion of the webbing 9 is sewn at 9b remote from the buckle-attaching end 9a.

In FIG. 3, which shows the anchor plate 2 of the first embodiment on an enlarged scale, the anchor plate 2 has a through-hole 2a adapted for receiving a non-illustrated bolt or the like to fasten the anchor plate 2 to a non-illustrated vehicle body. The anchor plate 2 also has a slot 2b through which the webbing 9 is to be threaded; the webbing 9 is then folded back to form a loop. A support member 8 in the form of a generally C-shaped bush is disposed in the folded-back portion of the webbing 9 and is engaged in the slot 2b, as shown in FIG. 1. The bush 8 has a tongue-like portion 8a extending longitudinally of the webbing 9, as shown in FIG. 1. As the resin cover 10 is molded in this condition, the tonguelike portion 8a is sandwiched between and embraced by the resin cover 10 and the webbing 9, thereby connecting the bush 8, in a unitary form with the resin cover 10 and the webbing 9, to the anchor plate 2. Since the resin cover 10 is formed integrally with the webbing 9 and covers the webbing 9 so as to overlap the tongue-like portion 8a of the bush 8, the webbing 9 is kept as self-supporting. Further, since the webbing 9 is not in direct contact with the anchor plate 2, it is possible to protect the webbing 9 against any wear and damage.

As shown in FIGS. 1 and 2, a stop 5 in the form of a pin is inserted in and through the folded-back portion 9a of the webbing 9 near the buckle 1 in such a manner that the opposite ends of the pin 5 project from the folded-back portion 9a to a uniform extent. With the pin 5 thus inserted, the resin cover 10 is molded in a unitary form with the webbing 9 and the pin 5. As a result, the pin 5 is joined with the resin cover 10 and the webbing 9. At that time, the resin cover 10 is formed so as to cover the entire peripheral surface of the folded-back portion 9a.

In this condition, the opposite ends of the pin 5 are received respectively in a pair of cut-outs 4a, 4a in the buckle base 4 of a generally C-shaped cross section in such a manner that the opposite ends of the pin 5 contact the respective vertical walls 4b, 4b of the stalk member 3. The buckle base 4 to which the stalk member 3 is thus joined is immovably attached to the lower casing 1a of the buckle 1. At that time, each of the opposite ends of the pin 5 is in contact with vertical walls 6a, 7a of a pair of locking projections 6, 7 formed at each side in the interior of the lower casing 1a of the buckcle 1, and the individual end of the pin 5 is pressed by a bent end 6b of the locking projection 6. Thus the opposite ends of the pin 5 are fixed to the lower casing 1a of the buckle 1. Therefore, the pin 5 is immovable in the horizontal direction, i.e. longitudinally of the stalk member, in FIG. 1 with the respect to the bse 4 of the buckle 1. The non-illustrated upper casing is joined with the lower casing 1a to thereby constitute the buckle 1. The stalk member 3 and the buckle 1 are thus connected together so as not to move in the horizontal direction of FIG. 1.

Figure 4:
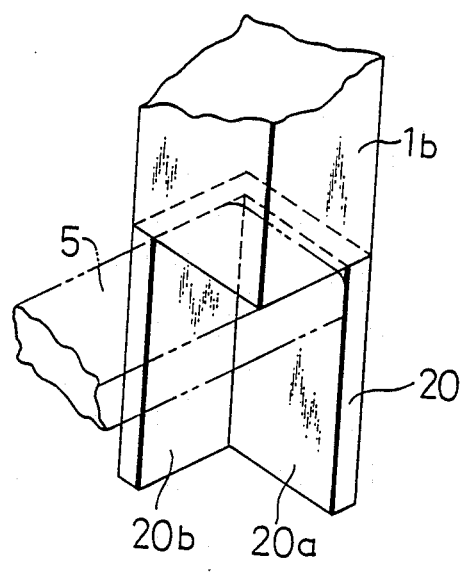
FIG. 4 is a detail perspective view of a second embodiment of the buckle stalk.

FIG. 4 illustrates a second embodiment of the present invention. The second embodiment is similar to the first embodiment except that a locking projection 20 of an L-shaped cross section and a jaw-like projection 1b are provided in place of the locking projections 6, 7. In the second embodiment, the pin 5 is held by vertical walls 20a, 20b of the locking projection 20 and the jaw-like projection 1b. In such a case, the locking projection 20 may be formed on the upper casing of the buckle, and the jaw-like projection 1b may be formed on the lower casing 1a of the buckle 1.

Figure 5:
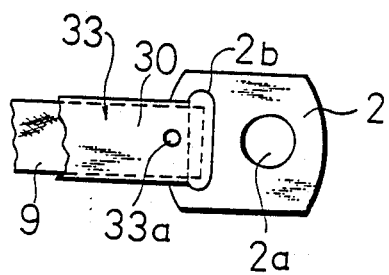
FIG. 5 is a detail plan view of a third embodiment of the buckle stalk.
Figure 6:
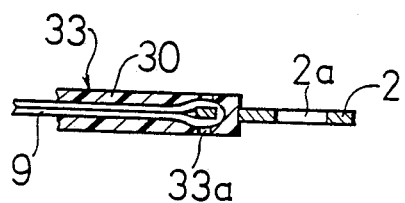
FIG. 6 is a longitudinal cross-sectional view of FIG. 5.

FIGS. 5 and 6 illustrate a third embodiment of the present invention. The third embodiment is similar to the first embodiment except that the bush 8 is omitted and that the slot 2b of the anchor plate 2 is entirely filled with the resin cover 30. Thus as the resin cover 30 covers the whole outer surface of the folded-back portion of the webbing 9 threaded through the slot 2b, the stalk member 33 is molded in a unitary form and remains to be self-supporting. In such case, it is preferable to push the webbing 9 at 33a by a part of a mold, such as pins, so as to prevent the webbing 9 from floating off the anchor plate 2.

Alternatively, the first embodiment may include the feature of the second embodiment in which the pin 5 is secured to the buckle 1 by the jaw-like projection 1b and the locking projection 20 and also the feature of the third embodiment in which the bush 8 is omitted.

Figure 7:
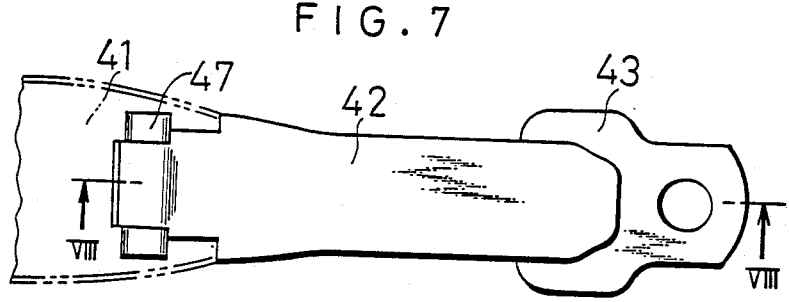
FIG. 7 is a fragmentary plan view of a fourth embodiment of the buckle stalk.
Figure 8:
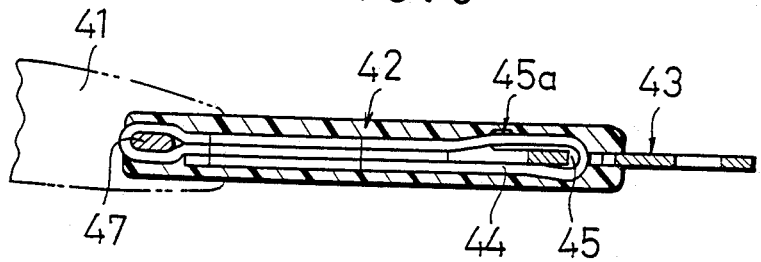
FIG. 8 is a longitudinal cross-sectional view taken along line VIII—VIII of FIG. 7.
Figure 9:
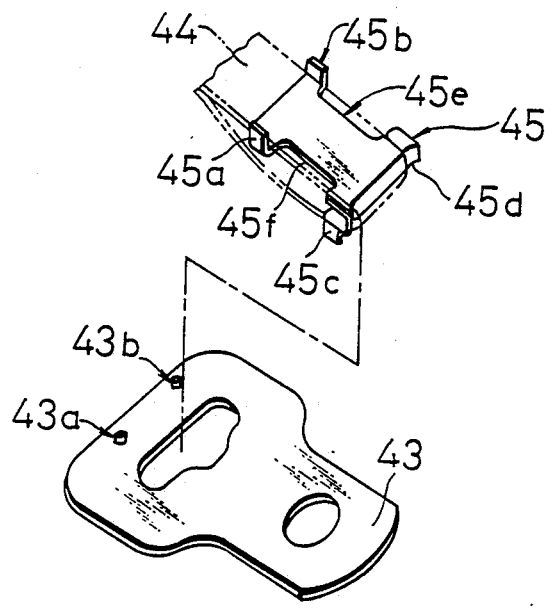
FIG. 9 is an exploded perspective view of an anchor plate of FIG. 7.

FIG. 7 is a plan view of a fourth embodiment of the present invention; FIG. 8 is a cross-sectional view taken along line VIII—VIII of FIG. 7; FIG. 9 is an exploded perspective view of an anchor plate of the fourth embodiment.

The buckle stalk according to the fourth embodiment comprises a buckle 41 adapted for releasably holding a seat belt (not shown), an anchor plate 43 adapted to be fastened to a floor of a vehicle body or the like, and a stalk member 42 connecting the buckle 41 and the anchor plate 43. A webbing 44 sewn so as to form at opposite ends a pair of loops extends longitudinally in and the stalk member 42 between the the buckle 41 and the anchor plate 42 so that a load exerted on the seat belt can be transmitted to the vehicle body via the webbing 44. The stalk member 42 is formed by covering the outer periphery of the webbing 44 with resin by molding in a unitary form.

A bush 45 serves to assist in preventing the webbing 44 from direct contact with the anchor plate 43 and hence from any damage. The bush 45 has a plurality of upright arms 45a, 45b, 45c, 45d for preventing any lateral displacement of the webbing 44. The anchor plate 43 has a pair of projections 43a, 43b which is engageable with a pair of recesses 45e, 45f, respectively, so that the anchor plate 43 and the bush 45 can be prevented from being mislocated with respect to one another.

The reference numeral 47 designates a pin which serves to prevent the webbing 44 from being accidentally removed off the base of the buckle 41.

Figure 10:
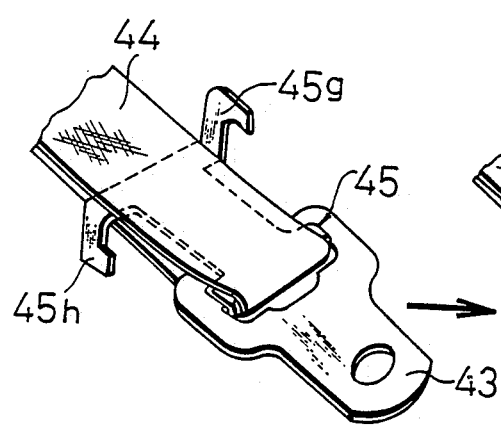
FIG. 10(a) is a perspective view of an anchor plate according to a fifth embodiment of the buckle stalk, showing a bush before arms of the bush have been bent.
FIG. 10(b) is a view similar to FIG. 10(a), showing the bush after the arms of the bush have been bent.
Figure 10:
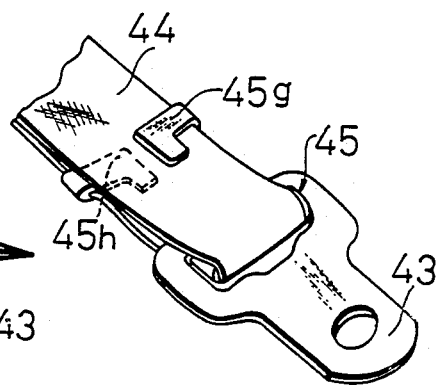

FIGS. 10(a) and 10(b) illustrate a modified bush 45 according to a fifth embodiment of the present invention. As shown in FIG. 10(a), the bush 45 has a a pair of generally L-shaped arms 45g, 45h initially projecting in opposite directions; then these two arms 45g, 45h are bent against the opposite outer surfaces of the webbing 44, as shown in FIG. 10(b), after the webbing 44 has been sewn at portions near the anchor plate 43. The arms 45g, 45h jointly serve to assist in keeping the bush 45 and the webbing 44 in a proper position relative to one another. Thereafter, the stalk member uniform in strength along its entire length can be formed by molding with resin.

With the foregoing arrangement, partly because the webbing and the resin cover are provided in a unitary form, and partly because the bush is provided with a tongue-like projection, or in a preferred form, the anchor-side foldedback portion of the webbing is completely covered by the resin cover in a unitarY form therewith, it is Possible to make the stalk member self-supporting so that the buckle stalk can be minimized in weight, thus realizing a buckle stalk that is lighter in weight and inexpensive to manufacture. If exsisting bushes mass-produced are applied to the present invention, additional reduction of the cost of procution can be achieved. If this bush is omitted and, in turn, the whole of the webbing is unified with the resin cover, it is possible to reduce the number of components, thus making the buckle stalk lighter in weight and less expensive.

Another advantage of the buckle stalk is that since the webbing does not directly contact the anchor plate of metal, the webbing is free from an damage due to contact with the metal. Further, since the pin as a stop is unified with the stalk member and is directly held by the vertical walls of the projections extending from the inside surface of the buckle, it is unnecessary to use any separate stop in holding the stalk member to the buckle, thus resulting in a reduced number of the component parts. Accordingly, the buckle stalk of the present invention is advance over the prior art construction in cost, weight and number of assembling steps. Still further, since the pin unified with the stalk member is directlY held by the vertical walls of the Projections, it is possible to restrict the movement of the Pin, thus causing more reliable holding of the pin.

Additionally, since the upright walls of the arms of the bush prevent the webbing from any displacement, namely, from being removed off the bush during the molding, the webbing can show an adequate degree of yielding strength. With an alternative form in which the anchor plate has positioning projections engageable with the bush, it is possible to keep the anchor plate and the bush in proper position relative to one another during the molding.

What is claimed is:

1. A buckle stalk for a seat belt system, comprising:
   (a) an anchor member adapted to be fastened to a vehicle body, said anchor member defining a slot;
   (b) a buckle adapted for releasably holding one end of a seatbelt strap;
   (c) a stalk member connecting aid anchor member and said buckle, said stalk member including an elongated webbing having at its opposite ends a pair of folded-back portions, and a cover covering a majority of said webbing and formed integrally with said webbing, one of said folded-back portions extending through said slot of said anchor member and the other being supported on a base of said buckle; and
   (d) a support member attached to said anchor member, provided between said anchor member and one of said folded-back portions of said webbing and having an extension which extends longitudinally from said slot beyond a buckle-side end edge of said anchor member to make said stalk member self-supporting, said support member being embraced by said webbing and said cover in a unitary form therewith.

2. A buckle stalk according to claim 1, in which said one folded-back portion is covered by said cover and is thereby connected to said anchor member.

3. A buckle stalk according to claim 1, in which said stalk member further includes a stop extending in and through the other folded-back portion near said buckle and held by said webbing and said cover in a unitary form therewith.

4. A buckle stalk according to claim 1, in which said buckle has in its base a pair of cut-outs receiving said stop and on a casing thereof a plurality of projections engaging said stop, said buckle being thereby fastened to said stop so as not to be movable longitudinally of said webbing.

5. A buckle stalk for a seat belt system in a vehicle, comprising:
   (a) an anchor member adapted to be fastened to a vehicle body, said anchor member defining a slot.
   (b) a buckle adapted for releasably holding a seat-belt strap;
   (c) a stalk member connecting said buckle and said anchor member, said stalk member including an elongated webbing having at its opposite ends a pair of folded-back portions, and a cover covering a majority of said webbing and formed integrally with said webbing, one of said folded-back portions extending through said slot of said anchor member and the other being supported on a base of said buckle;
   (d) a support member provided between said anchor member and one of said folded-back portions of said webbing, having a combination of extensions extending from said slot toward said buckle with said anchor member interposed between said extensions, and attached to said anchor member; and (e) a means for preventing any lateral displacement of said webbing relative to said support member, said means being arranged on at least one of said combination of extensions of said support member.

6. A buckle stalk according to claim 5, wherein said displacement preventing means has a pair of upright arms extending upwardly from one of said extensions and being engageable with both side edges of said webbing respectively and a pair of upright arms extending upwardly from the other extension and being engageable with both the side edges of said webbing respectively.

7. A buckle stalk according to claim 5, wherein said displacement preventing means has a first arm and a second arm extending from one of said extensions in such a way that the first arm embraces one of side edges of said webbing and said second arm embraces the other side edges of said webbing.

8. A buckle stalk for a seat belt system, comprising:
(a) an anchor member adapted to be fastened to a vehicle body;
(b) a buckle adapted for releasably holding one end of a seat-belt strap;
(c) a stalk member connecting said anchor member and sai buckle, said stalk member including an elongated webbing having at its opposite ends a pair of folded-back portions, and a cover covering a majority of said webbing and formed integrally with said webbing, said folded-back portions supporting said anchor member and said buckle at a base of said buckle; and
(d) a support member attached to said anchor member and having an extension which extends longitudinally in one of said folded-back portions of said webbing to make said stalk member self-supporting, said support member being embraced by said webbing and said cover in a unitary form therewith;

wherein said stalk member further includes a stop extending in and through the other folded-back portion near said buckle and held by said webbing and said cover in a unitary form therewith; and wherein said buckle has in its base a pair of cut-outs receiving said stop and on a casing thereof a plurality of projections engaging said stop, said buckle being thereby fastened to said stop so as not to be movable longitudinally of said webbing.

9. A buckle stalk for a seat belt system, comprising:
(a) an anchor member adapted to be fastened to a vehicle body, said anchor member defining a slot;
(b) a buckle adapted for releasably holding one end of seatbelt strap;
(c) a stalk member connecting said anchor member and said buckle, said stalk member including an elongated webbing having at its opposite ends a pair of folded-back portions, and a cover covering a majority of said webbing and formed integrally with said webbing, one of both said folded-back portions extending through said slot of said anchor member and the other being supported on a base of said buckle;
(d) a support member provided between said anchor member and one of said folded-back portions of said webbing, having a combination of extensions extending from said slot toward said buckle with said anchor member interposed between said extensions, and attached to said anchor member; and
(e) a means for locating said support member in a predetermined position relative to said anchor member, said means being arranged between said anchor member and said extensions of said support member.

10. A buckle stalk according to claim 9, wherein said locating means comprises projections formed on said anchor member and engageable with said support member.

* * * * *